United States Patent Office
2,903,724
Patented Sept. 15, 1959

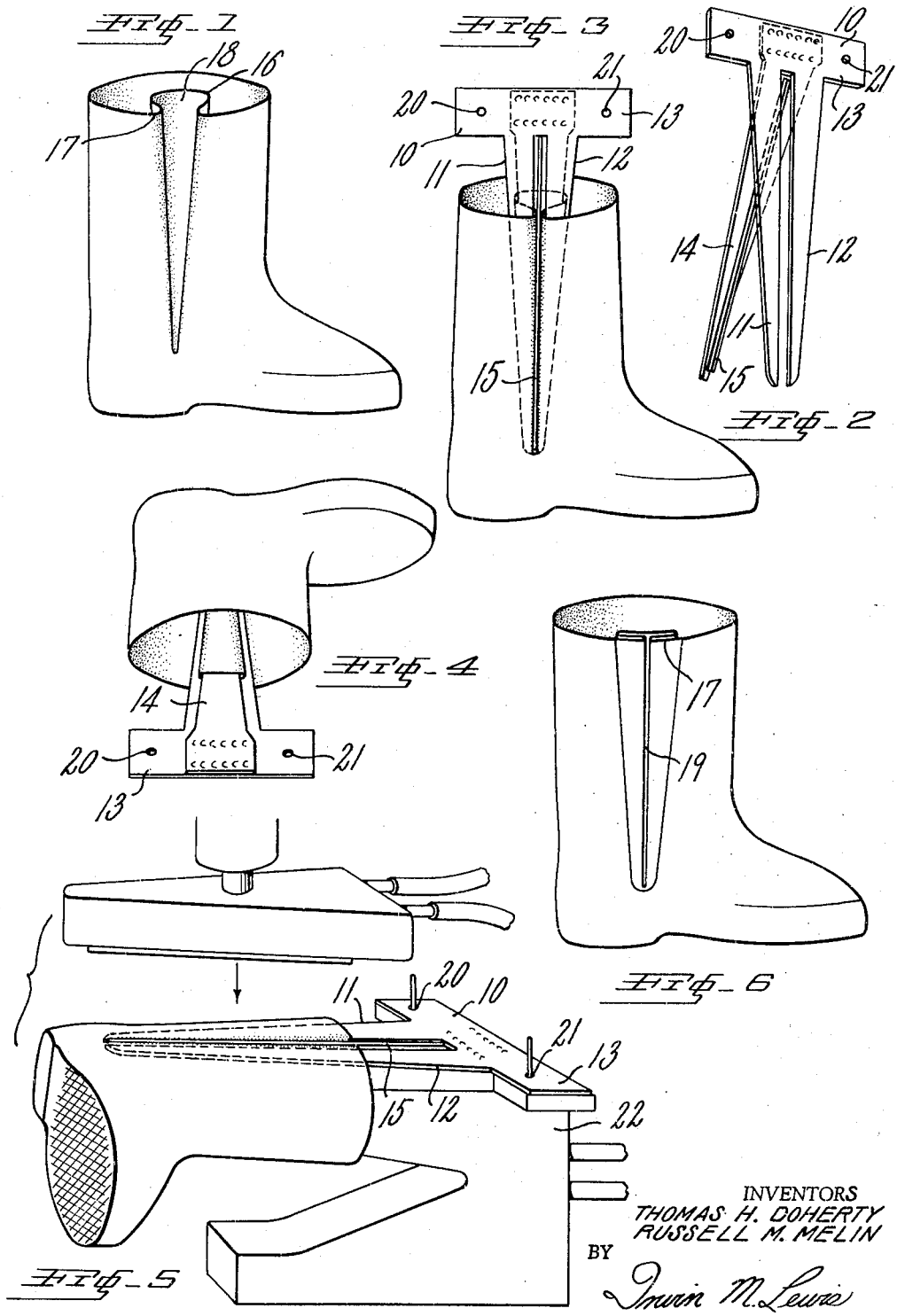

2,903,724

DEVICE FOR FORMING A PLEAT IN THERMO-PLASTIC MATERIALS

Thomas H. Doherty, South Bend, and Russell M. Melin, Mishawaka, Ind., assignors to United States Rubber Company, New York, N.Y., a corporation of New Jersey Application February 19, 1958, Serial No. 716,214

3 Claims. (Cl. 12—103)

This invention relates to a tool or device for forming a pleat in thermoplastic material, and more specifically, to a tool for forming a pleat in the leg-encircling portion of thermoplastic footwear.

The process of manufacturing footwear and similar hollow articles by slush molding has assumed increased importance in recent years. Such articles have been formed efficiently and economically using the many vinyl plastisol materials that have become commercially available. The preparation of plastisols and their use in the slush casting of articles of footwear are well known by those skilled in the art and are described in more detail in Modern Plastics 26, 78 (April 1949) by Perrone and Neuwirth and in U.S. Patent No. 2,588,571.

However, because of limitations inherently imposed by both the method of making the slush molds, and also by the flow and deposition of the vinyl materials in the slush molding process, it has not been possible to mold directly into the product the very thin, crisp, compact sort of folds or pockets with which the public has been familiar in conventional footwear, for example, hand assembled rubber footwear. Even if it were possible to make such molds and to secure a uniform deposit of material on the inner surfaces of the mold, there would still remain the very difficult problem of stripping the finished article from the mold. Accordingly, where a flap, pocket or pleat was desired, as in the upper portion of a slush cast gaiter, a loose fold or fin on the exterior of the article was generally the best that could be provided.

It is the object of the present invention to transform this loose fold into a crisp pleat or pocket having sharp creases, so as to provide a neat, smooth, snug-fitting article of footwear with reduced bulk. It is a further object of this invention to facilitate the forming of such a sharply creased pleat or pocket on the inside of the plastic boot or gaiter.

In accordance with these objectives, we have invented a tool comprising a pair of plates interconnected at one end and held in co-planar, parallel spaced relation, and a third plate overlapping and resiliently attached at one end to the interconnected ends of the first plates, this third plate having a rib extending from its surface and protruding into the space between the first plates.

When this tool is inserted into a loose fold which has been cast into the upper of an article of thermoplastic footwear, it will hold the fold in a manner that will permit the formation of a crisp pleat or pocket by the addition of heat and pressure. Where the pair of interconnected plates are uniformly tapered from their connected bases to a point, so as to be triangular in shape, it is possible to form a pleat or pocket that will give the boot an extremely snug-fitting appearance. Thus, it is possible to convert a boot made by the slush-molding process into a neat, smooth-fitting article of footwear.

With the above and other objects in view, the invention will be hereinafter more fully described and the combination and arrangement of parts more clearly shown by reference to the accompanying drawings in which:

Fig. 1 is a perspective view of a slush cast article of thermoplastic footwear showing the loose fold cast in the upper portion thereof before the creasing operation has commenced;

Fig. 2 is a perspective view of our tool showing the pair of plates sprung apart from the rib-carrying plate in the interest of clarity;

Fig. 3 is an elevational view of the article of footwear of Fig. 1 showing the tool of Fig. 2 inserted into position for creasing;

Fig. 4 is a perspective view looking into the upper portion of the article of footwear and showing the tool inserted into position for creasing;

Fig. 5 is a perspective view showing the article of footwear with the tool in place preparatory to the creasing operation; and Fig. 6 is a perspective view of the article of footwear after the creasing operation.

Referring now more particularly to the drawings, Fig. 1 shows a typical article of footwear manufactured by the slush molding process. The loose fold in the upper portion is an example of the best pocket that can be formed by the casting process itself. With the use of our tool, however, as shown in Figs. 2–5 inclusive, a crisp, compact, sharply creased pleat or pocket can be formed, as illustrated in Fig. 6.

The tool 10 in its preferred form is shown in Fig. 2. Preferably it is constructed of metal, as for example aluminum. However, it is also possible to use a glass cloth epoxy resin laminate tool or a tool made of any high heat-resistant thermoset plastic material. The tool 10 is composed of two tapered plates 11 and 12 which are connected by a base plate 13 which may be an integral part of the two tapered plates 11 and 12. A space of substantially uniform width is provided between these two plates 11 and 12.

A third plate 14 is secured at one end to the base plate 13 and overlies the two spaced plates 11 and 12. This third plate 14 may be secured to the two spaced plates 11 and 12 in any suitable manner, as for example by spot welding.

The third plate 14 is made of a resilient material such as metal and is attached so that it will tend to remain in close contact with the first two plates 11 and 12. Thus, a considerable amount of force will be necessary to separate the third plate 14 from the first two plates 11 and 12, as shown in Fig. 2.

This third plate 14 has a rib 15 extending from its surface and protruding into the space between the first two plates 11 and 12. This rib 15 may be attached to the third plate 14 by welding or some similar process.

In the production of a finished pleat, the tool 10 is inserted into the loose fold 16 in the upper of Fig. 1. The first two plates 11 and 12 fit behind the lips 17 of the pocket and hold them together in position as desired in the final, pressed shoe, as shown in Fig. 3. The third plate 14 is inserted into the pocket space 18 itself. This third plate 14 forms and holds the internal pocket tongue and prevents the adhesion of the faces of the pocket 18 during the actual creasing operation. This can be seen in Fig. 4.

The rib 15 on the third plate 14 separates and prevents adhesion of the pocket lips 17 during the forming, as shown in Fig. 3. Use of this rib 15 will also provide a smooth, cleanly-formed separation at the pocket opening 19.

The tool 10 may be provided with positioning holes 20 and 21 which, in register with a heated press 22, will secure accurate location of the pocket, as shown in Fig. 5.

Since the parallel spaced plates 11 and 12 are uniformly tapered in the preferred arrangement, one tool can serve to crease pockets in a variety of sizes of boots. This is possible if the pockets to be formed in the smaller sizes are exact portions of the largest uniformly tapered pocket to be made.

After the tool 10 has been inserted into the fold 16 of the upper, the combination is placed on a forming press 22, as shown in Fig. 5. Means to introduce heated liquids into the upper and lower portions of the press 22 are provided. When the press 22 has been heated to the desired temperature, pressure is applied to the upper to crease the fold 16 into a crisp pocket, as shown in Fig. 6.

It has been found that with the use of our new tool, thermoplastic materials of varying thicknesses can be readily creased. If the upper is made of a film material, successful creasing is possible at varying thicknesses up to 0.060 in. Uppers formed of a plastic film with a cellular or sponge plastic insulation have been effectively creased in thicknesses up to approximately 0.150 in. Such cellular or sponge insulation may be formed by slush casting an additional integrally-bonded interior layer of vinyl plastisol containing a blowing agent after the exterior skin has gelled. This technique is more fully described in British Patent No. 725,100.

Forming time, pressure and temperature vary with the thickness and nature of the material to be formed. For example, it has been found that when a film material with a cellular or sponge lining is to be creased, 30 pounds pressure on a 4 inch cylinder at a temperature of approximately 320° F. held for a period of 1 minute 45 seconds will give good results. When a film plastisol material without additional insulated lining is to be creased, 40 to 60 pounds pressure on a 4 inch cylinder at a temperature of approximately 250° F., held for about 45 seconds is required for satisfactory results. Marketable quality requires that the temperatures, pressures and times be controlled within reasonable limits for a particular thickness and type of shoe material.

Where a shoe upper is lined with an insulating cellular plastic material, the use of pressure and heat in conjunction with our new tool not only creases the exterior skin material, but also substantially compresses the cellular or sponge lining in the area of the pocket. This reduces the bulk in the pocket region and contributes to the production of a trim, neatly fitting article.

If the upper part of the press is provided with an embossing die or plate, any desired texture may be imparted to the outside of the pocket area. Inking the face of the embossing plate will permit printing to be done on the outside pocket area.

From the foregoing description taken in connection with the accompanying drawings, the advantages of the tool and the article derived from its use will be readily understood by those skilled in the art. While there has been described a best embodiment of the invention, it is to be understood that such description is merely illustrative and that changes may be made as are within the scope of the claims.

Having thus described our invention, what we claim and desire to protect by Letters Patent is:

1. A tool for forming a pleat in thermoplastic material comprising a pair of substantially similar triangular plates, means interconnecting said plates at the bases thereof and holding said plates in co-planar, parallel, spaced relation, and a third triangular plate overlapping and resiliently attached at its base to said bases of said first plates, said third plate having a rib extending from the surface thereof and protruding into the space between said first plates.

2. A tool for forming a pleat in thermoplastic material comprising a pair of substantially similar triangular plates, means interconnecting said plates at the bases thereof and holding said plates in co-planar, parallel, spaced relation, and a third triangular plate overlapping and resiliently attached at its base to said bases of said first plates, the marginal edges of said third plate lying in parallel relation, respectively, to the exterior marginal edges of said first plates, said third plate having a rib extending from the surface thereof and protruding into the space between said first plates.

3. A tool for forming a pleat in thermoplastic material comprising a pair of substantially similar plates, means interconnecting said plates at one of their ends and holding said plates in co-planar, parallel, spaced relation, and a third plate overlapping and resiliently attached at one end to said ends of said first plates, said third plate having a rib extending from the surface thereof and protruding into the space between said first plates, said rib being of substantially the same length as said space between said first plates.

References Cited in the file of this patent

UNITED STATES PATENTS

| 103,224 | Mersereau | May 17, 1870 |
| 1,166,174 | Bisbee | Dec. 28, 1915 |
| 2,186,647 | Loud et al. | Jan. 9, 1940 |

FOREIGN PATENTS

| 113,761 | Great Britain | Mar. 7, 1918 |